3,405,131
TRIAZINE SALT
Hugh T. Harrison, Tulsa, Okla., assignor to The Dow Chemical Company, Midland, Mich., a corporation of Delaware
No Drawing. Filed Oct. 22, 1964, Ser. No. 405,834
3 Claims. (Cl. 260—242)

The present invention is directed to organic chemistry and is particularly directed to a triazine salt which is a mono-salt of, on the one hand, 2-chloro-4,6-bis(ethylamino)-s-triazine, and, on the other hand, a member selected from the group consisting of hexafluoroarsenic acid and hexafluorophosphoric acid. The compounds of the present invention are solid materials which are useful as parasiticides for the control of a number of insect, mite, nematode, crustacean, and helminth organisms, such as southern armyworm, two-spotted spider mite, rootknob nematode, daphnia, and *Ascaris lumbricoides suum*.

In the present specification and claims, the term 2-chloro-4,6-bis(ethylamino)-s-triazine is employed in its customary sense to designate a compound being of the following formula:

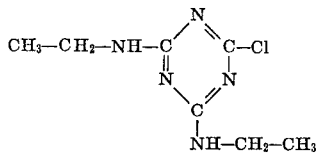

The compounds of the present invention are prepared by reacting 2-chloro-4,6-bis(ethylamino)-s-triazine with hexafluoroarsenic or hexafluorophosphoric acid. Conveniently, the reaction is carried out in an inert liquid reaction medium, such as water or a lower alkanol. The reaction is exothermic and takes place smoothly at temperatures of from —10° to 80° C. The amounts of the reactants which are employed are not critical; however, the reaction consumes the reactants in amounts which represent equimolecular proportions, and it is preferred to supply the reactants in amounts which represent such proportions or in amounts which represent one molecular proportion of 2-chloro-4,6-bis(ethylamino)-s-triazine and an excess of one molecular proportion of hexafluoroarsenic or hexafluorophosphoric acid.

The hexafluoroarsenic or hexafluorophosphoric acid reactant is usually supplied to the reaction mixture as a liquid. Conveniently the liquid employed is the commercial product which contains 65 percent $HasF_6$, 21 percent $H_2O$, and 14 percent related arsenic acids, or the commercial product which contains 65 percent $HPF_6$, 21 percent $H_2O$, and 14 percent related phosphorus acids. In other procedures, a liquid containing one of the acids is prepared in the manner of Nuttall et al. in their preparation of an aqueous solution of hexafluorophosphoric acid. See the Journal of the Chemical Society (London), 1960, pp. 4965–4970. In yet other procedures, it is sometimes convenient to supply the hexafluoroarsenic or hexafluorophosphoric acid reactant as a hydrate.

In carrying out the reaction, the 2-chloro-4,6-(ethylamino)-s-triazine is contacted with the hexafluoroarsenic acid or the hexafluorophosphoric acid in any conventional manner, ordinarily by adding one reactant to the other reactant. The temperature of the resulting reaction mixture can be controlled by regulating the rate of the contacting of the reactants as well as by external cooling. Upon completion of the contacting of the reactants, most of the reaction will have taken place with the production of the desired product in the reaction mixture. Where optimum yields are desired, it is often preferred that the reaction mixture be allowed to stand for a period of time following the completion of the contacting of the reactants. When the reaction has been carried as far as desired, or upon essential completion of the reaction, the inert liquid reaction medium can be removed from the reaction mixture by evaporation or distillation under subatmospheric pressures to obtain the desired mono-salt product as a residue. In alternative procedures, the desired mono-salt product can be separated from the reaction mixture by filtration to obtain the product as a residue.

The product residue can be employed for the useful purposes of the present invention or can be purified by conventional procedures, such as washing with water or suitable organic liquid, or recrystallization, before being so employed.

The following examples set forth the best mode of the present invention now known by the inventor, and will enable those skilled in the art to practice the present invention.

Example 1.—2-chloro-4,6-bis(ethylamino)-s-triazine hexafluoroarsenate

2 - chloro - 4,6 - bis(ethylamino) - s - triazine (about 6.4 grams; 0.03 mole) was mixed with 100 milliliters of ethanol and 25 milliliters of water. Thereafter, the mixture was heated to a temperature of about 55° C. and hexafluoroarsenic acid, hexahydrate (25 grams; 0.08 mole) was added portionwise over a period of time to the heated mixture to prepare a reaction mixture. During the addition, the reaction mixture was maintained at a temperature of from 50° to 60° C. Immediately following the completion of the addition of the acid hexahydrate reactant, the reaction mixture was filtered to separate a portion of 2-chloro-4,6-bis(ethylamino)-s-triazine product as a residue. The resulting separated portion of product was air dried for about a period of one hour. During this period, the filtrate was cooled to a temperature of about 0–5° C. to precipitate an additional portion of 2-chloro-4,6-bis(ethylamino)-s-triazine product in the reaction mixture. This second portion of product was separated by filtration and air dried. The two portions were combined, and the product found to melt at 138–140° C.

In a similar manner, employing 2-chloro-4,6-bis(ethylamino)-s-triazine and hexafluorophosphoric acid, there is prepared 2-chloro-4,6-bis(ethylamino)-s-triazine hexafluorophosphate product having a molecular weight of 347.7 and melting at 112–114° C.

When one of the products of the present invention is employed as a parasiticide, the unmodified product can be utilized. However, the present invention also encompasses the utilization of the product together with a parasiticide adjuvant. In such utilization, the product can be dispersed on a finely divided solid and the resulting preparation employed as a dust. Also, a product of the present invention, or a composition comprising a product of the present invention and a finely divided solid, can be dispersed in water with the aid of a wetting agent and the resulting aqueous suspension employed as a spray. In other procedures, a product according to the present invention can be employed as the constituent of organic liquid compositions, oil-in-water or water-in-oil emulsions, or water dispersions, with or without the addition of a wetting, dispersing, or emulsifying agent.

In representative operations, a treating composition containing, as sole active agent, 25 parts of 2-chloro-4,6-bis(ethylamino)-s-triazine hexafluorophosphate per million parts by weight of ultimate treating composition, was employed as a drench to treat soil heavily infested with rootknot nematode (Meloidogyne spp.). About a week later, the soil thus treated was planted with a known number of cucumber seeds, and the resulting cucumber seedlings permitted to grow for several weeks. At that time, the cucumber plants were uprooted and examined, and there was found a 100 percent kill and control of rootknot nematode.

I claim:
1. Mono-salt of 2-chloro-4,6-bis(ethylamino)-s-triazine and a member selected from the group consisting of hexafluoroarsenic acid and hexafluorophosphoric acid.
2. 2-chloro-4,6-bis(ethylamino)-s-triazine hexafluoroarsenate.
3. 2-chloro-4,6-bis(ethylamino)-s-trizaine hexafluorophosphate.

References Cited

UNITED STATES PATENTS

| | | | |
|---|---|---|---|
| 2,891,855 | 6/1959 | Gysin et al. | 260—249.8 XR |
| 3,022,150 | 2/1962 | Weed | 260—249.8 XR |
| 3,122,536 | 2/1964 | Harrison | 260—242 |
| 3,122,552 | 2/1964 | Harrison | 260—271 |
| 3,189,428 | 6/1965 | Mussell | 260—242 XR |

HENRY R. JILES, *Primary Examiner.*

J. M. FORD, *Assistant Examiner.*